(12) United States Patent
Runge (10) Patent No.: US 11,374,408 B2
(45) Date of Patent: Jun. 28, 2022

(54) REDUCTION OF HARMONICS IN POWER NETWORKS

(71) Applicant: Jörn Runge, Hamburg (DE)

(72) Inventor: Jörn Runge, Hamburg (DE)

(73) Assignee: innogy SE, Essen (DE)

(*) Notice: Subject to any disclaimer, the term of this patent is extended or adjusted under 35 U.S.C. 154(b) by 0 days.

(21) Appl. No.: 16/999,920

(22) Filed: Aug. 21, 2020

(65) Prior Publication Data

US 2020/0381920 A1   Dec. 3, 2020

Related U.S. Application Data

(63) Continuation of application No. PCT/EP2019/053939, filed on Feb. 18, 2019.

(30) Foreign Application Priority Data

Feb. 22, 2018 (DE) .................. 10 2018 103 996.4

(51) Int. Cl.
  *H02J 3/01* (2006.01)
  *H02J 3/18* (2006.01)
  (Continued)

(52) U.S. Cl.
  CPC .............. *H02J 3/01* (2013.01); *G05B 19/042* (2013.01); *H02J 3/18* (2013.01); *H02J 3/24* (2013.01);
  (Continued)

(58) Field of Classification Search
  CPC ........ H02J 3/01; H02J 3/18; H02J 3/24; H02J 3/381; H02J 2300/28; H02J 2300/24;
  (Continued)

(56) References Cited

U.S. PATENT DOCUMENTS

| | | | |
|---|---|---|---|
| 2008/0177425 A1* | 7/2008 | Korba ................ | H02J 3/1814 700/297 |
| 2011/0076972 A1* | 3/2011 | Cooley ................ | H03J 1/048 455/154.1 |

(Continued)

FOREIGN PATENT DOCUMENTS

EP       2 033 060 A2    3/2009

OTHER PUBLICATIONS

"The Influence of Topology Changes on Interarea Oscillation Modes and Mode Shapes", by Yousu Chen, etc., published on IEEE Xplore in year 2011 (Year: 2011).*

*Primary Examiner* — Thomas C Lee
*Assistant Examiner* — Charles Cai
(74) *Attorney, Agent, or Firm* — Reinhart Boerner Van Deuren P.C.

(57) ABSTRACT

A method performed by one or more devices is disclosed in which network topology information indicative of a function of a power network is gathered at a predetermined nominal frequency. The nominal frequency is influenced by a power input, a power output, a rotational speed, a torque, a modulation angle, and/or a phase angle of components included in the power network. Harmonic information indicative of one or more harmonic levels is determined from the components of the power network or from one or more network nodes. The harmonic information is determined based on the network topology information. Evaluation information indicative of an occurrence of one or more resonances and/or harmonic level increases in the power network is determined. The evaluation information is determined based on the determined harmonic information. The determined evaluation information is output.

17 Claims, 4 Drawing Sheets

(51) Int. Cl.
  *H02J 3/24* (2006.01)
  *H02J 3/38* (2006.01)
  *G05B 19/042* (2006.01)

(52) U.S. Cl.
  CPC ...... *H02J 3/381* (2013.01); *G05B 2219/2619* (2013.01); *G05B 2219/2639* (2013.01); *H02J 2300/24* (2020.01); *H02J 2300/28* (2020.01)

(58) Field of Classification Search
  CPC .......... G05B 19/042; G05B 2219/2619; G05B 2219/2639; Y02E 10/56
  See application file for complete search history.

(56) References Cited

U.S. PATENT DOCUMENTS

| | | | | |
|---|---|---|---|---|
| 2011/0292687 | A1* | 12/2011 | Barthold | H02M 3/07 363/15 |
| 2017/0184640 | A1 | 6/2017 | Pileggi et al. | |
| 2019/0163152 | A1* | 5/2019 | Worrall | H02J 13/0013 |

* cited by examiner

REDUCTION OF HARMONICS IN POWER NETWORKS

CROSS-REFERENCE TO RELATED PATENT APPLICATIONS

This patent application is a continuation of PCT/EP2019/053939, filed Feb. 18, 2019, which claims the benefit of German Patent Application No. 10 2018 103 996.4, filed Feb. 22, 2018, the entire teachings and disclosure of which are incorporated herein by reference thereto.

FIELD

The invention relates to methods and devices by means of which, inter alia, network topology information is used to determine and reduce the resulting harmonics and interharmonics (both also summarized below under the term harmonics).

BACKGROUND

In power networks, depending on the operating state of the components comprised by it, such as wind turbines, synchronous generators and motors, asynchronous generators and motors, double-fed asynchronous generators and motors, generators and motors connected via converters and sources of electrical energy (e.g. photovoltaic systems), transformers, coupled structures, HVDC transmissions (high-voltage direct current transmissions), and/or consumers (e.g. loads), reactive power compensation systems, harmonic filtering systems, cables and/or overhead lines different harmonic wave levels may be created. In certain situations, these levels are too high because, for example, a feed frequency, e.g. from a wind turbine, is amplified or not attenuated by network or controller resonances. These situations often occur in transitional states, e.g. during network construction (specific switching sequence of all network equipment) of a wind farm.

Individual components or networks of components of the power network can be damped according to an oscillation system close to the resonant frequency, so that sometimes large amplitudes can occur with low damping. This is often undesirable and can lead to a resonance catastrophe. For the purposes of this object, a resonance catastrophe is understood to mean that, as a result of a resonance catastrophe that has occurred, one or more components of the power network are sometimes irreversibly damaged.

It would be desirable to be able to provide a solution that avoids, in particular, damage to individual components that can be caused by harmonics.

BRIEF DESCRIPTION

Against the background of the described state of the art, it is therefore the task to at least partially reduce or avoid the described problems, i.e. in particular to provide a cost-effective possibility to avoid or reduce harmonics that are sometimes expected or occur in a power network.

According to a first aspect of the invention, a method is described, performed by one or more devices, the method comprising:

Gathering of network topology information indicative of a function of a power network at a predetermined nominal frequency, the nominal frequency being influenced at least partially by an active and/or reactive power input and/or an active and/or reactive power output and/or a rotational speed and/or a torque and/or a modulation angle and/or a phase angle of one or more components which are included in the power network;

Determining harmonic information indicative of one or more harmonic levels from the one or more components of the power network or from one or more network nodes, wherein the harmonic information is determined at least partially based on the network topology information;

Determining an evaluation information indicative of an occurrence of one or more resonances and/or harmonic level increases in the power network, wherein the evaluation information is determined at least partially based on the determined harmonic information; and Outputting of the determined evaluation information.

According to a second aspect of the invention, a device is described which is adapted or comprises corresponding means to perform and/or control a method according to the first aspect. Devices of the method according to the first aspect are or comprise in particular one or more devices according to the second aspect. For example, the device is a server, or a server cloud (several servers which together perform and/or control a method according to the first aspect).

According to the second aspect of the invention, an alternative device is also described, comprising at least one processor and at least one memory containing computer program code, wherein the at least one memory and the computer program code are adapted to perform and/or control with the at least one processor at least one method according to the first aspect. A processor is to be understood, for example, as a control unit, a microprocessor, a micro-control unit such as a microcontroller, a digital signal processor (DSP), an application-specific integrated circuit (ASIC) or a field programmable gate array (FPGA).

For example, an exemplary device further comprises means for storing information such as a program memory and/or a main memory. For example, an exemplary device according to the invention further comprises means for receiving and/or transmitting information via a network such as a network interface. For example, exemplary inventive devices are interconnected and/or connectable via one or more networks.

An exemplary device according to the second aspect is or comprises, for example, a data processing system which is set up in terms of software and/or hardware to be able to perform the respective steps of an exemplary method according to the second aspect. Examples of a data processing system are a computer, a desktop computer, a server, a thin client and/or a portable computer (mobile device), such as a laptop computer, a tablet computer, a wearable, a personal digital assistant or a smartphone.

Individual method steps of the method according to the first aspect (for example the gathering of network topology information) can be performed with a sensor device (e.g. measuring device), which also has at least one sensor element. Likewise, individual method steps (for example determining harmonic information and/or determining evaluation information), which, for example, do not necessarily have to be performed with the sensor device, can be performed by a further device, which is connected in particular via a communication system to the device which has at least one sensor element.

Further devices may be provided, for example a server and/or for example a part or component of a so-called computer cloud, which dynamically provides data processing resources for different users in a communication system. In particular, a computer cloud is understood to be a data processing infrastructure according to the definition of the "National Institute for Standards and Technology" (NIST) for the English term "Cloud Computing".

According to the second aspect of the invention, a computer program is also described which comprises program instructions which cause a processor to perform and/or control a method according to the first aspect if the computer program runs on the processor. An exemplary program according to the invention may be stored in or on a computer-readable storage medium containing one or more programs.

According to the second aspect of the invention, a computer-readable storage medium is also described which contains a computer program according to the second aspect. A computer-readable storage medium may be, for example, a magnetic, electrical, electro-magnetic, optical and/or other type of storage medium. Such a computer-readable storage medium is preferably physical (i.e. "touchable"), for example it is designed as a data carrier device. Such a data carrier device is for example portable or permanently installed in a device. Examples of such a data carrier device are volatile or non-volatile random access memories (RAM) such as NOR flash memories or sequential access memories such as NAND flash memories and/or read-only memories (ROM) or read-write memories. Computer-readable shall be understood to mean, for example, that the storage medium can be read and/or written by a computer or data processing equipment, for example a processor.

According to a third aspect of the invention, a system is also described comprising a plurality of devices, in particular several servers, which together perform a method according to the first aspect.

In a further embodiment of the method, at least one of the devices for performing the procedure is a mobile device. In particular, communication via a communication system can be performed between a mobile device, for example a smartphone, laptop, tablet, wearable or camera, and at least one further device. According to one embodiment, the device comprises a communication interface according to the second aspect. For example, the communication interface is designed for wired or wireless communication. For example, the communication interface is a network interface. The communication interface is preferably designed to communicate with a communication system. Examples of a communication system are a local area network (LAN), a wide area network (WAN), a wireless network (for example, according to the IEEE 802.11 standard, the Bluetooth (LE) standard, and/or the NFC standard), a wired network, a cellular network, a telephone network, and/or the Internet. A communication system may include communication with an external computer, for example, via an Internet connection.

In the following, further features and exemplary embodiments are described according to all exemplary aspects of the present object:

The term harmonics is used in the sense of the present object to describe occurring or resulting harmonics and interharmonics in the power network.

Power networks can be structured in different ways. Individual parts of a power network can have different structures, which are defined, for example, by switching states and/or operating states of one or more components of the power network. This is also referred to as network topology. The structure formed by the power network, comprising, for example, one or more components (e.g. electricity generating installations, such as a wind turbine, consumers, storage devices, or the like, to name only a few non-limiting examples) and their interconnection (e.g. arrangement in series or parallel) may be represented by the network topology information in the sense of the present object. In the following examples of common network topologies, in which at least part of the power network can be arranged (e.g. switched), are listed:

(i) Radiation network:

In the case of a network topology in the form of a radiation network, the power network is supplied, for example, from a central supply point (e.g. a power generation system such as a wind turbine). Individual lines, also known as stub lines, extend radially to one or more consumers (e.g. loads, storage devices, or similar, to name but a few non-limiting examples). The individual lines can, for example, be operated in dependence on a given direction of energy flow.

(ii) Ring network:

For the purposes of the present object, ring networks, also referred to as rings, are structures of the power network in which the supply of individual consumers takes place in the form of a ring line. Hereby, one or more power generation plants may be electrically connected to the ring line. For example, a load as a consumer can be supplied from "two sides" via the ring. This has the advantage that, for example, in the event of a technical defect, the ring around the fault causing the technical defect can be opened so that the consumers can continue to be supplied away from the fault. The disconnection of a section of the ring surrounded by the power network can sometimes require the actuation of one or more switching steps (e.g. at specially designed switching points). In the case of onshore or offshore wind turbines, for example, these can be electrically connected to a ring network, e.g. via a corresponding transformer station. In the event of a technical defect in the ring, for example, such a switching can be performed so that wind turbines can continue to feed in electricity, for example.

(iii) Mesh network:

Mesh networks usually have several electricity generating installations feeding into them at different points. The consumers of a mesh network are distributed in a network that has several nodes and branches. These multiple nodes and branches of a mesh network may in turn be arranged in a ring network, so that a ring network forms the superordinate structure of a mesh network, for example. Furthermore, several such mesh networks can be connected to each other. These are also referred to as composite networks, which are usually such a spatial combination of several mesh networks.

For example, a power network may comprise several voltage levels, e.g. an extra-high voltage network (e.g. 380/220 kV), a high voltage network (e.g. 110 kV), a medium voltage network (e.g. 35 kV) and a low voltage network (e.g. 230/400 V). Between the voltage levels, a transformation is performed, e.g. by means of suitable transformers. For example, there is a transformation between the extra-high and high-voltage network, the high- and medium-voltage network, and the medium and low-voltage network. All voltage levels covered by such a power network can represent a part of the network topology in the sense of the present object and be represented by corresponding information.

A harmonic level in the sense of the present object (e.g. in an alternating current network) is a sinusoidal component of a periodic oscillation, unequal to the nominal frequency of the power network (e.g. unequal to 50 Hz at a corresponding nominal frequency of the power network). The harmonic information may, for example, comprise one or more such harmonics, each of which, for example, has been determined for the one or more components of the power network.

Three-phase systems (e.g. a 400 V power network), for example, regularly have only certain harmonic characteristics with odd harmonics. How harmonic currents propagate in a power supply system (e.g. a power network) and which voltage and current distortions result depends on the characteristics of the harmonic generators (e.g. generators, converters and loads) and the characteristics of all passive components connected to or comprised in the corresponding power network. For example, voltage-dependent impedances (saturation effect in transformers and generators) have the effect that harmonic currents can occur, e.g. due to magnetization when the voltage or current is too high. The prevailing harmonic level at one or more components of the power network can also be influenced by a phase shift between different currents of the same frequency.

The network topology information is gathered, for example, by gathering the respective switching states of one or more components of the power network and/or the equivalent circuit diagrams of all relevant components. For example, it can be gathered whether a switch in the power network is switched on or off (e.g. switching status on or off). Furthermore, one or more operating states of one or more components of the power network, such as generator(s) and/or load(s), can be gathered. For example, an operating point, a temperature, a rotational speed, which connection to a node of the power network exists, or a combination of these, to name only a few non-limiting examples, can be gathered. The gathering can be based, for example, on switching status information transmitted by the respective components of the power network, which is transmitted, for example, to a central point (e.g. a network control center). Alternatively or additionally, such switching status information can be tracked to the respective one or more components included in the power network, wherein, for example, the corresponding (i.e. current) switching status of the respective component of the one or more components is recorded manually. This can, for example, be performed by an employee, wherein the corresponding switching status information is stored centrally (e.g. in the network control center). For example, a (data) memory (e.g. comprising a database) can store switching status information of the one or more components comprised in the power network. A switching state information can, for example, comprise or represent possible switching states and/or operating points of the power network (such as active power, reactive power, torque, rotational speed, modulation angle, step-switch position, or the like, to name only a few non-limiting examples) of the components of the power network (such as generators, loads, converters, transformers, as well as reactive power compensation, to name only a few non-limiting examples).

Furthermore, the network topology information may, for example, comprise one or more structures, wherein one or more components of the power network may be part of or a combination of the above structures (radiation network, ring network, and mesh network). The network topology information can represent, for example, that the power network is composed of a combination of several of the above-mentioned structures, wherein the one or more components of the power network are comprised by at least one of these structures.

The arrangement of one or more components of the power network forms a structure at least in one or more parts of the power network. The overall arrangement accordingly represents a network topology of the power network. The gathering of the network topology information is performed, for example, by a device according to the second aspect. Such a device is, for example, a network control center or is comprised by a corresponding network control center (e.g. a server). The gathering of the network topology information can be performed, for example, by means of one or more sensors which are connected, for example, to such a device or are comprised by such a device, wherein by means of the one or more sensors an operating state and/or a structure of at least one or more parts of the power network can be gathered (e.g. measured).

The determination of the harmonic information can, for example, be performed in such a way that for each of the components comprised by the power network the corresponding harmonic level (e.g. amplitude and frequency of the harmonic(s)) is determined (e.g. identified) for the operating state of the power network (which is determined, for example, by one or more structures and the switching state of the one or more components). Alternatively or additionally it can be determined whether one or more harmonic levels are present or not. The determined harmonic information may accordingly represent, for each of the one or more components, corresponding information of the type specified above.

A resonance (in the following also called resonance situation) exists, for example, if one or more components of the power network are excited in such a way that large amplitudes are applied to the corresponding component. This can occur, for example, if there is only a small damping of the excitation (e.g. from a feeding wind turbine). Such a resonance situation is undesirable, since in extreme cases this can lead to a resonance catastrophe, in which the one or more corresponding components of the power network can sometimes be irreversibly damaged.

In the event that an existing amplification of a harmonic of current or voltage in the power network has a value greater than or equal to 1 of the nominal voltage or nominal current, a resonance catastrophe is assumed in the sense of the present object. The resonance catastrophe can lead to the destruction of a technical device (e.g. the one or more components included in the power network) by excessive harmonic amplitudes in case of resonance. In the case of a periodically recurring excitation which frequency coincides with a resonant frequency, more and more energy is transferred to the power network or individual components of the one or more components of the power network and absorbed there. The oscillation energy is caused by energy from an oscillating system via heat and/or ohmic components, such as in the power network. This can be caused, for example, by consumers or ohmic impedance shares in one or more components of the power network. If the energy input exceeds the power dissipation, the oscillation amplitude will increase until the load limit is exceeded.

The determined evaluation information is then outputted or its output is initiated. The particular piece of evaluation information can, for example, be outputted to one of the one or more devices or to a further device. Furthermore, the particular piece of evaluation information can be outputted to a device that transfers the particular piece of evaluation information to one of the one or more devices.

In an exemplary embodiment according to all aspects, the method also includes

Determining control information indicative of a change of a switching state of the power network and/or an operating mode of the power network and/or of the one or more components of the power network, the control information being determined in such a way that the one or more resonances and/or harmonic level increases determined on the basis of the evaluation information are avoided or resolved; and Outputting the determined control information.

The determination of the control information may also be indicative of a change in an operating condition of the one or more components of the power network.

Changing the switching state includes, for example, switching on and/or off one or more components of the power network. In particular, changing the switching state of the power network includes changing one or more parts of the structure of the power network. For example, Radiation, ring and/or mesh networks comprised in the structure of the power network can be changed (e.g. closing or opening of rings). To change the switching state of the power network, one or more switching steps may be necessary.

In the event that several switching steps are required to change the switching state, it could happen during the processing of these several switching steps that a performed switching step leads to an operating state of the power network, in which for example a resonance occurs. In order to avoid this, the control information, which for example comprises one or more switching steps for changing the switching state of the power network, can be determined in such a way that such a resonance is avoided for the one or more components of the power network. This can be done, for example, by determining before the corresponding switching step is performed whether or not a resonance exists for the operating state of the power network after the switching step has been performed.

The specific control information is then output or its output is initiated. The control information can, for example, be output in the same way as the determined evaluation information or its output can be initiated in the same way. The output of the control information can, for example, be directed to an operator (e.g. from a network control center), so that, for example, the one or more switching steps covered by the control information can be proposed to the operator.

If, for example, too high levels (amplitudes) occur during operation of the power network, an optimization of the network topology can be performed automatically with the help of a measured level frequency on the basis of the method described in the first aspect, so that an detuning, shifting and/or reduction of this resonance is performed or suggested to the operator.

In an exemplary embodiment according to all aspects, a change of the switching state of the power network is causable at least partially based on the control information.

In addition, for example, a change in the operating status of one or more components of the power network can be caused at least partially based on the control information.

In an exemplary embodiment according to all aspects, the method further comprises:

Performing one or more switching steps to establish the switching state of the power network determined and changed according to the control information.

In addition, one or more switching steps may be performed to establish the operating state of the one or more components of the power network as determined and modified according to the control information.

An exemplary embodiment according to all aspects provides that the control information comprises one or more control parameters, whereby a control parameter is indicative of a switching action for a component of the one or more components covered by the power network.

The change of the network topology, for example, is essentially automated, e.g. by transmitting a control parameter to a component or several components of the power network that can be remotely controlled. At least partly based on the transmitted control parameter, the correspondingly designed component or components can be controlled, e.g. by an actuator connected to the corresponding component, which performs an action (e.g. switching a switch on or off, controlling a transformer (transformer)) in accordance with the control parameter. Alternatively or additionally, a change in the network topology can be caused manually at least partially based on the control information. For example, the switching steps covered by the control information can be performed manually (e.g. on site) on the respective component determined according to the corresponding switching step.

The change in the network topology causes, for example, a detuning, shifting and/or reduction of one or more resonance situations that have occurred from time to time, or avoids the occurrence of such resonance situations by detuning, shifting and/or reduction.

A further exemplary embodiment according to all aspects provides that the control information is determined in such a way that, based on a switching sequence comprised by the control information, intermediate states are taken into account in order to bypass one or more resonances and/or harmonic level increases during switching.

After each switching step performed according to the switching sequence, a change in the network topology occurs. Resonance or an increase in harmonic level can also occur or be present with this network topology, which is changed after a switching step has been performed. In most cases it is possible, for example, to cause an unlocking of a component of the power network by several different switching steps. Accordingly, it is taken into account, for example, whether one or more resonances and/or harmonic level increases can occur for one or more components of the power network in these intermediate states. The control information is determined accordingly in such a way that resonances that are to be expected from time to time are avoided by including a switching sequence in the control information in which one or more resonances and/or harmonic level increases do not occur in the power network.

For example, resonance information can be stored in a memory for possible switching and/or operating states of the power network, or linked accordingly. Resonance information in the sense of the present object means a current and/or voltage amplitude of a relevant network node depending on the frequency.

Accordingly, resonance information can, for example, represent a current and/or voltage amplitude of a relevant network node as a function of the frequency. Before a switching step is performed and/or before the final determination of the control information, for example, the database can be queried and it can be analyzed whether or not one or more resonances and/or harmonic level increases are to be expected in an intermediate state caused by a switching step. Otherwise a different switching sequence or other (i.e. different from the first switching steps) switching steps may be comprised in the control information, so that the control information is determined accordingly.

In an exemplary design according to all aspects, the determination of harmonic information is based at least partially on one or more harmonic calculations and/or on one or more harmonic measurements.

A harmonic measurement can be performed with a network analyzer, for example. Alternatively or additionally, the determination of the harmonic information can be calculated. Here, for example, possible harmonic frequencies are determined based on the (known) operating state of the power network and the arrangement of the components comprised by the power network in relation to each other.

For example, a script-based and/or automated evaluation of all structures (topologies) of the power network can be performed. Since the number of possible resonance curves can increase exponentially with an increasing number of nodes in the power network, the resonance curves of all possible topologies can be determined iteratively.

In general, the more "network", i.e. the more components included in the power network are electrically connected to a node, the lower frequency resonances occur, since more storage devices reduce or attenuate harmonics due to their "inertia". Accordingly, the control information can be determined in such a way that as much "network" as possible is electrically connected to one or more nodes after the network topology has been changed. These are, for example, those of the one or more nodes that are closest to a component to be activated (e.g. a wind turbine to be connected, to name just one non-limiting example), of the power network.

Based on the specific harmonic information and/or resonance information, for example, an operations manager or a network operations management (e.g. a network control center of the power network) can use this data to avoid dangerous operating states. In doing so, e.g. by means of a neural network, fuzzy controllers, particle swarm approaches, Traveling Sales Man approaches, Monte Carlo or similar, to name but a few non-limiting examples, an optimal network topology change (e.g. with the optimization goal of a level reduction with minimal feed reduction or minimal load shedding or maintaining critical feeders or loads, to name only a few non-limiting examples) or a network topology development (e.g. a defined switching sequence to avoid resonances that sometimes occur) are proposed.

According to another design, the power system can include at least one controller for changing the network topology from the following group:
  PI-controller;
  I-controller;
  Status controller;
  Condition observer;
  Fuzzy controller;
  Monte Carlo controller;
  Controller comprising a neural network; and
  Controller based on metaheuristic optimization algorithms (e.g. particle swarm).

For example, neural networks can be set up to preferably train all variants of network topologies and/or feed-in scenarios of onshore and/or offshore wind energy systems accordingly. A neural network can be configured and, in particular, trained in such a way that a control deviation, for example, by a reactive power controller (e.g. the reactive power at the network connection node) is gathered and the neural network reacts appropriately thereto, wherein the limits (in particular current, voltage) of at least one wind turbine being taken into account so that a corresponding change in the network topology of the power network can be caused.

For example, based at least partially on the control information, a change in the power network can be made using the at least one controller.

In addition or alternatively, an optimization algorithm (e.g. Monte Carlo, neural network trained with calculation results, maximum value control, or the like, to name just a few non-limiting examples) can be used during operation for an operator to determine a network topology with reduced harmonic levels by (e.g. online) calculations (e.g. using a server cloud), or by "trial and error" in the real power network.

A further exemplary embodiment according to all aspects provides that the gathering of network topology information comprises those components of the power network which are arranged in electrical proximity to the planned change.

In particular, the gathering of the network topology in electrical proximity to a planned disconnection and/or connection of a component covered by the power network can be performed. For example, it may be planned to connect another wind turbine to the power network. The gathering of the network topology can, for example, include up to 10, 20, 30, 40 or 50 consecutive nodes starting from the location (e.g. a node of the power network) of the power network that is to be changed (e.g. component to be activated and/or wind turbine to be connected, to name just a few non-limiting examples).

Accordingly, the network topology information captured is limited to an electrical proximity (e.g. in the range of 10 to 50 successive nodes of the power network). This is usually sufficient for the consideration of the part of the power network that is most likely to be affected by a possible resonance, since in the case of nodes that are further away or connected via more distant nodes and covered by the power network, a possible resonance is attenuated to such an extent that it is regularly no longer significant.

An exemplary embodiment according to all aspects provides that the method is performed preventively before a planned change of the switching state of the power network.

In addition, the method can be performed, for example, preventively before a planned change in the operating status of one or more components of the power network.

In an exemplary embodiment according to all aspects, the method is performed based on a current switching state of the power network (and optionally the operating state of one or more components of the power network).

Furthermore, the method can be performed in all aspects, for example based on a current operating status of the one or more components of the power network.

For example, before a planned change of the switching state and/or the operating state of one or more components of the power network, it can be determined preventively whether the planned change can cause one or more resonances and/or harmonic level increases, or whether this is avoidable. Whether the planned change will cause one or more resonances and/or harmonic level increases can be determined, for example, by the harmonic calculation and/or harmonic measurement mentioned above.

Furthermore, the case may occur that one or more resonances and/or harmonic level increases occur during operation, for example because it was not determined for a planned change, for example, whether one or more resonances and/or harmonic level increases may occur. Accordingly, the method in question can be performed continuously, for example, so that the power network can be monitored, and one or more resonances and/or harmonic level increases can be quickly gathered on the one hand, and on the other hand can then be resolved again by a change in the power network. In this way, in particular, major damage that can occur in the network as a result of one or more resonances and/or harmonic level increases can be effectively avoided or reduced.

In an exemplary embodiment according to all aspects, a switching action or a change for a component of the power network represents at least one of the following switching actions or changes i) to xiii):

i) Closing or opening of one or more rings;
ii) Coupling or disconnecting of one or more busbars;
iii) Supplying loads via one or more reserve network access points;
iv) Changing of one or more transformer ratios;
v) Switching off or switching on one or more filters;
vi) Switching off or switching on one or more compensations;
vii) Changing a torque of one or more components of the power network;
viii) Changing an operating point consisting of rotational speed and/or torque and/or active power and/or reactive power of one or more components of the power network;
ix) Changing the rotational speed of one or more components of the power network;
x) Switching off or switching on of already connected components;
xi) Changing an active power input or output of one or more components of the power network;
xii) Changing a reactive power input or output of one or more components of the power network; and
xiii) Changing a modulation angle and/or phase angle of an inverter.

In particular, one or more of the components—also referred to as network components—may be one or more of the components listed below and included in the power network:

Switch;
Switchgear;
Overvoltage arrester;
Overcurrent arrester;
Overhead line;
Inspection line;
Transformers;
Cables; and
High-voltage direct current transmissions.

One or more switching operations i) to xiii) can lead to detuning, shifting and/or reduction of resonances in the power network, as these cause or lead to a change in the network topology.

A busbar is used to connect lines and transformers, for example in substations. In high-voltage systems, there are fields which are usually made up of a number of busbar isolators (corresponding to the number of parallel busbars), a current and voltage transformer or combined transformer, a circuit breaker and/or a line isolator (also called outgoing circuit isolator). With the help of multiple busbar isolators, an outgoing feed can be connected to different busbars. Depending on the switching state, the network topology is changed accordingly.

Filters, e.g. network filters for the network voltage can be passive filters without active elements, such as transistors.

A compensation is, for example, a reactive power compensation (also called reactive current compensation), which reduces an undesired displacement reactive power and associated reactive current of electrical consumers (e.g. loads, storage tanks or similar) in AC voltage networks. Reactive power compensation is performed, for example, by compensating inductive or capacitive reactive power by means of capacitive or inductive consumers.

Furthermore, reactive power compensation is possible by means of compensation filters such as capacitors connected in parallel, but only at a frequency which equals the frequency of the fundamental oscillation (e.g. the network frequency of 50 Hz).

Another exemplary embodiment according to all aspects provides that the determination of the harmonic information comprises determining voltages, currents and/or frequencies at one or more nodes of the power network.

Based on the specific voltages, currents and frequencies at one or more nodes of the power network, the harmonic information can be determined (e.g. calculated).

In an exemplary embodiment according to all aspects, the determination of the harmonic information comprises at least the inductive and/or capacitive components comprised in the power network.

The inductive and/or capacitive components in particular influence harmonics or cause harmonics, so that a possible resonance can be determined, in particular based on the inductive and/or capacitive components included in the network topology.

An exemplary embodiment according to all aspects provides that possible switching states of the power network and/or operating points (such as active power, reactive power, torque, rotational speed, modulation angle, step-switch position, or the like, to name only a few non-limiting examples) of the components of the power network (such as generators, loads, converters, transformers, as well as reactive power compensation, to name only a few non-limiting examples) are stored in a database, wherein resonance information is linked (or comprises) to each stored switching state and/or operating point, the resonance information being indicative at least of whether or not one or more resonances and/or harmonic level increases are present in the switching state and/or operating point.

The possible switching states and/or operating points (also referred to as operating states in this description) of the power network can, for example, be represented by at least one switching state information.

In addition, possible operating states of the one or more components of the power network can be stored in the database, for example, wherein resonance information is associated (or included) with each stored operating state, wherein the resonance information is indicative at least of whether or not one or more resonances and/or harmonic level increases are present in the operating state. The possible operating states of the one or more components of the power network can, for example, be included or represented by an operating state information.

The database is, for example, a so-called "look-up table", wherein information stored in the database can be retrieved, for example by querying data.

The resonance information can, for example, be a binary resonance information. Alternatively, the resonance information can be a non-binary resonance information, e.g. represented by a probability value, a frequency course or the like, to name just a few non-limiting examples.

The database is, for example, comprised of or connectable to the one or more devices which carry out the method in question. After a run-through of the method in question based on the gathered network topology information, the result, in particular whether one or more resonances and/or harmonic level increases can endanger for example one or more components of the power network, can be stored in the database. If, for example, a planned change of the switching state, and optionally in the operating state, of one or more components of the power network is to be performed or caused, the result can be stored in the database after a switching step (e.g. of several switching steps for changing the network topology), and optionally the operating state of one or more components of the power network can be compared to those stored in the database, so that if one or more resonances and/or harmonic level increases are to be expected with this change, these can be avoided accordingly, for example by selecting other switching steps for causing the changed network topology.

In an exemplary configuration according to all aspects, a respective resonance information is determined for each switching state and/or operating point of the one or more components of the power network, wherein all possible switching states and/or operating points of the one or more components of the power network are taken into account and a corresponding resonance information is calculated (e.g. iteratively) for each of all possible switching states and/or operating points.

In addition, for example, a respective resonance information can be determined for each operating state of the power network, wherein all possible operating states of the one or more components of the power network are taken into account and resonance information is calculated for each of all possible switching states (e.g. iteratively).

Accordingly for example, a simulation of all possible switching and/or operating states that the power network represented according to the network topology information can assume can be performed. The corresponding results, in particular whether one or more resonances and/or harmonics and/or harmonic level increases can occur in the power network according to the defined network topology, can be stored in a database or the database itself, for example.

A further exemplary embodiment according to all aspects provides for that the resonance information is represented in frequency characteristics of amplitudes of current and/or voltage, so that it can be determined whether or not there is a risk of a resonance catastrophe and/or harmonic level increase for a component or a network node or several components or a network area of the power network.

For example, a network area comprises several nodes of the power network and/or several components of the power network.

The exemplary embodiments of the present invention described above in this description should also be understood as disclosed in all combinations with each other. In particular, exemplary embodiments should be understood in relation to the different aspects disclosed.

In particular, the previous or following description of method steps according to preferred forms of the performing of a method should also disclose corresponding means for performing the method steps by preferred embodiments of a device. Likewise, the disclosure of means of a device for performing a method step should also disclose the corresponding method step.

Further advantageous exemplary embodiments of the invention can be found in the following detailed description of some exemplary embodiments of the present invention, in particular in connection with the figures. The figures, however, are only intended to clarify, but not to determine the scope of protection of the invention. The figures are not to scale and are merely intended to illustrate the general concept of the present invention. In particular, features contained in the figures are not intended to be regarded as a necessary element of the invention.

DETAILED DESCRIPTION

The following description serves for further understanding of the object and should be understood in such a way that it complements the above general description of some exemplary embodiments and should be read together with it.

Figure 1:
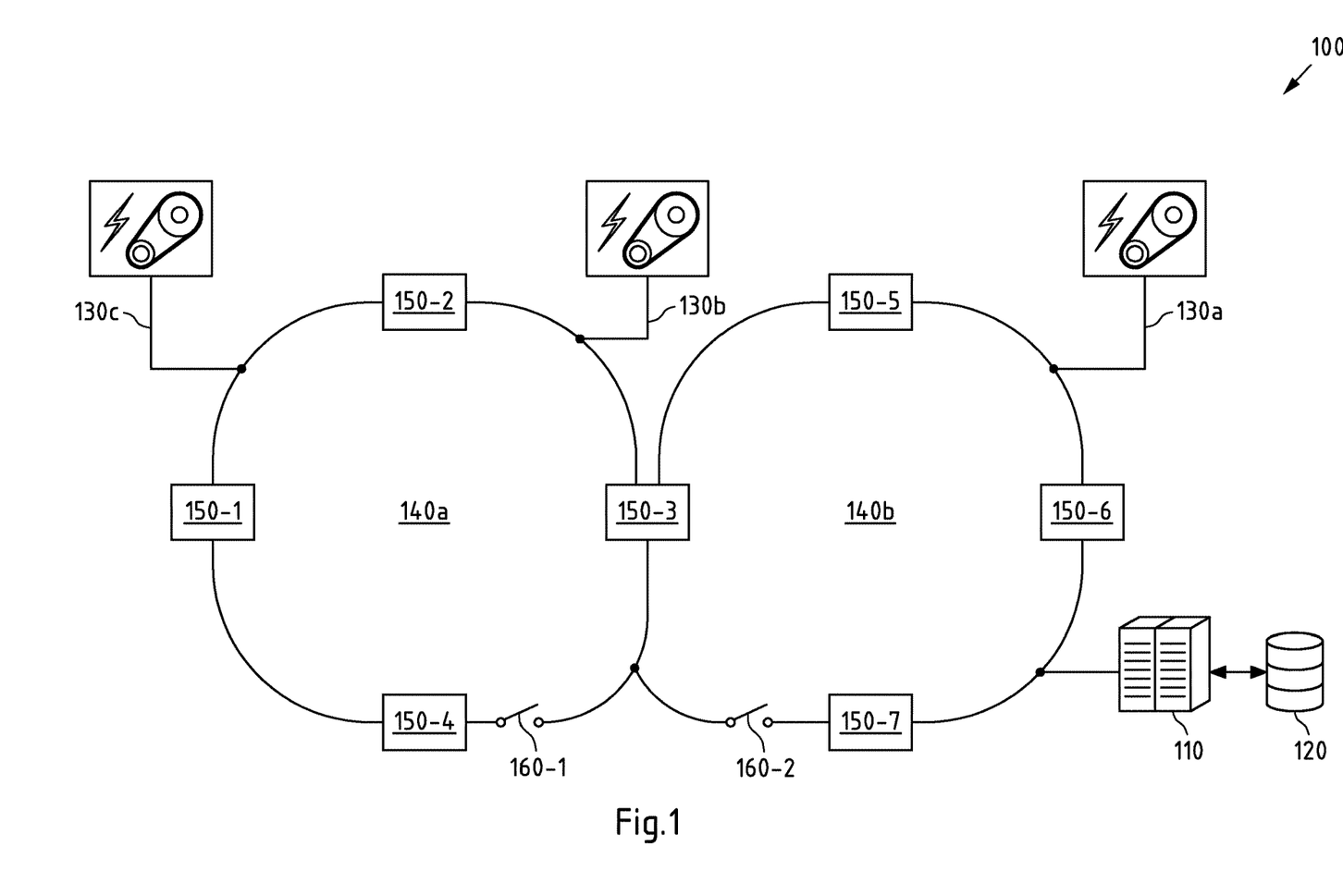
FIG. 1 depicts a system according to the third aspect in an exemplary and objective embodiment.

FIG. 1 shows a schematic block diagram of a System 100 according to the third aspect. The System 100 comprises a server 110, alternatively designed as a server cloud (e.g. a plurality of servers connected e.g. via the Internet and providing services at least partially together), an optional database 120, presently three generators or loads 130a-c (e.g. wind turbines), a power network comprising a first and a second ring network 140a and 140b, as well as several components 150-1 to 150-7 and further components 160-1 and 160-2 of the power network designed as switches.

According to an objective embodiment, the Server 110 records network topology information of the power network, determines harmonic information, e.g. for each or at least a part of the components 150-1 to 150-7 included in the power network, as well as for the components 160-1 and 160-2 each designed as a switch, and determines an evaluation information indicative of whether a resonance is present or not for at least one component 150-1 to 150-7, as well as for the components 160-1 and 160-2 of the power network, and subsequently outputs the determined evaluation information, e.g. for further processing by another device or a server of the Server Cloud, to name only a few non-limiting examples.

If resonance information is available, the structure, i.e. network topology of the power network can be changed, for example, by opening or closing one or both of the components 160-1 and/or 160-2, which are designed as switches. Opening switch 160-1, for example, results in the structure of ring network 140a being opened by the power network. The same applies analogously to ring network 140b. Such a change in the network topology of the power network will cause detuning, shifting and/or reduction of sometimes prevailing resonances.

Figure 2:
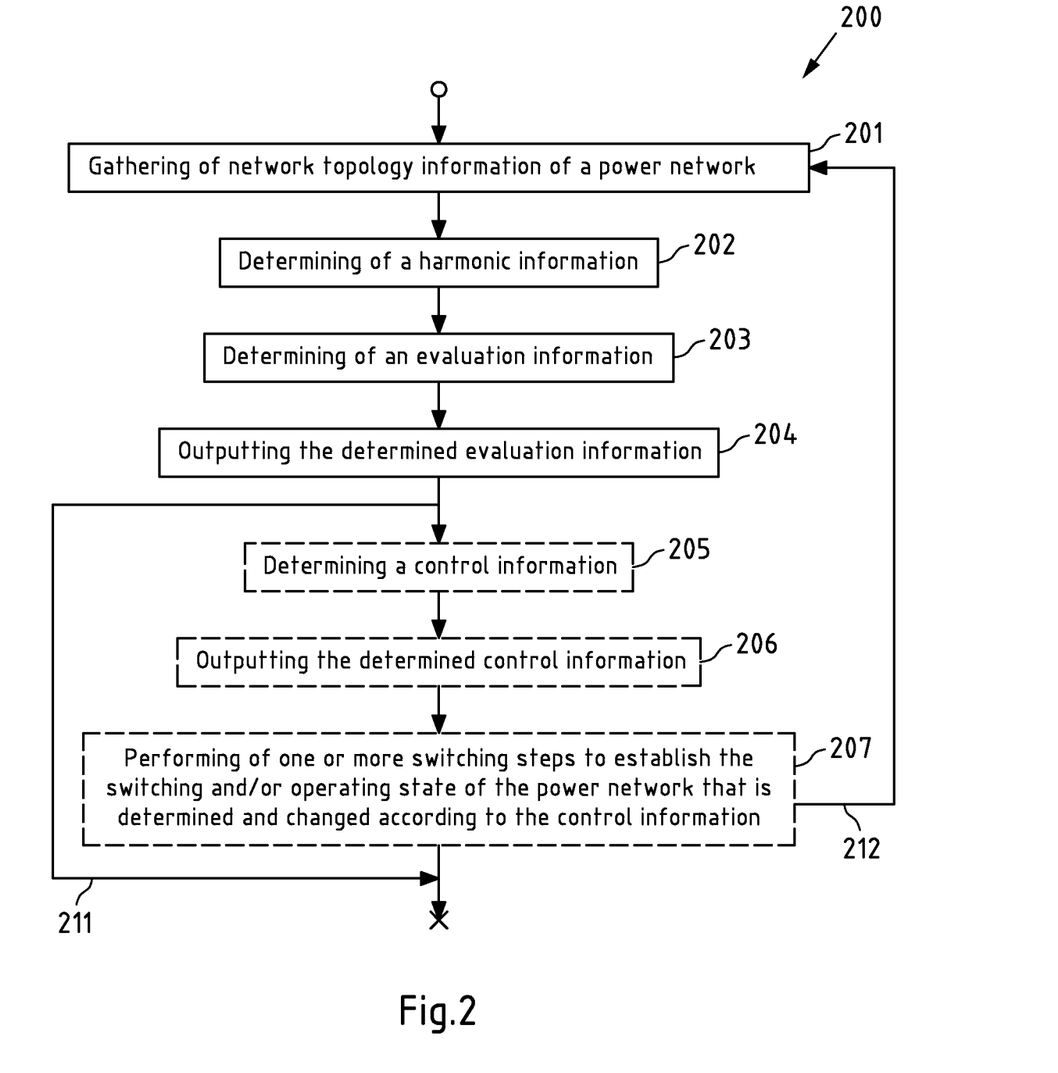
FIG. 2 is a flowchart according to an exemplary embodiment of a method according to the first aspect.

FIG. 2 shows a flowchart 200 of an exemplary embodiment of a method according to the first aspect. The flowchart 200 can be performed by a device, e.g. Server 110 according to FIG. 1.

In a first step 201, network topology information indicative of a function of a power network at a predetermined nominal frequency is gathered, whereby the nominal frequency is at least partially influenced by an active and/or reactive power input and/or an active and/or reactive power output. Furthermore, the nominal frequency can be at least partially influenced by a rotational speed, a torque, a modulation angle and/or a phase angle which one or more components and/or generators and/or loads of the power network have.

The network topology information is defined, for example, by one or more switching states (e.g. switch on or off) and/or one or more operating states of one or more components (e.g. components 150-1 to 150-7, and/or components 160-1 and 160-2 according to FIG. 1) of the power network. The arrangement of the one or more components of the power network forms a structure at least in one or more parts of the power network. The overall arrangement represents the network topology of the power network. The gathering of the network topology information is performed, for example, by a device according to the second aspect, e.g. the Server 110 according to FIG. 1. The Server 110 represents, for example, a network control center or is included in a corresponding network control center. The gathering of the network topology information can be performed, for example, by means of one or more sensors which are connected to or included in the Server 110 according to FIG. 1, whereby an operating state and/or a structure of at least one or more parts of the power network can be gathered (e.g. measured) by means of the one or more sensors.

In a second step 202 a determination of a harmonic information takes place. The determination of the harmonic information is performed for example by a device according to the second aspect, e.g. by the server 110 according to FIG. 1. Alternatively or additionally the determination of the harmonic information can be performed by a server cloud (not shown in FIG. 1), wherein for example the device which performed the gathering of the network topology information in step 201 is connected via a communication connection (e.g. a communication network, e.g. the Internet) to at least one server of the server cloud. The servers of the server cloud also have a communication connection between themselves. The communication connection between the servers included in the Server Cloud can also be made via a communication network, e.g. the Internet.

In a third step 203 an evaluation information is determined. The determination of the evaluation information is performed, for example, by a device according to the second aspect, e.g. by the server 110 according to FIG. 1. Alternatively or additionally the determination of the evaluation information can be performed by a server cloud (not shown in FIG. 1).

In a fourth step 204 outputting of the determined evaluation information takes place.

Steps 205 to 207 are optional and are performed in exemplary embodiments according to all aspects, sometimes in addition to steps 201 to 204.

In the event that the optional steps 205 to 207 are not performed, the flowchart 200 ends after step 204, which is represented by the branch marked with the reference sign 211.

In a fifth step 205, control information is determined. Determination of the control information is performed, for example, by a device according to the second aspect, e.g. by the server 110 according to FIG. 1. Alternatively or additionally, determination of the control information can be performed by a server cloud (not shown in FIG. 1).

In a sixth step 206, outputting the control information determined according to step 205 takes place. The determined evaluation information (step 204) and/or the control information determined in step 205 can be output, for example, to a device coordinating one or more actuators (not shown in FIG. 1), so that this device can, for example, automatically cause a change in the operating state of the power network (see also step 207).

In a seventh step 207, one or more switching steps are performed to establish a switching and/or operating state of the power network that is determined and changed according to the control information.

Afterwards the flowchart 200 can optionally be performed again. This is represented by the branching marked with the reference sign 212 and referring back to step 201. For example, in a second pass in step 201, the gathered network topology information can represent the operating state of the power network changed according to step 207 of a first pass.

After determining the harmonic information (step 202), steps 203 and—if included in the flowchart—the optional step 205 can be performed in parallel. Alternatively, these steps 202, 203, and optionally step 205 can also be performed sequentially, i.e. one after the other. Furthermore, the performing of the flow chart 200 can already be terminated after the optional step 206 (not shown) for the case that, for example, the performing of step 207 is only planned for the future and has not yet been scheduled.

Figure 3:
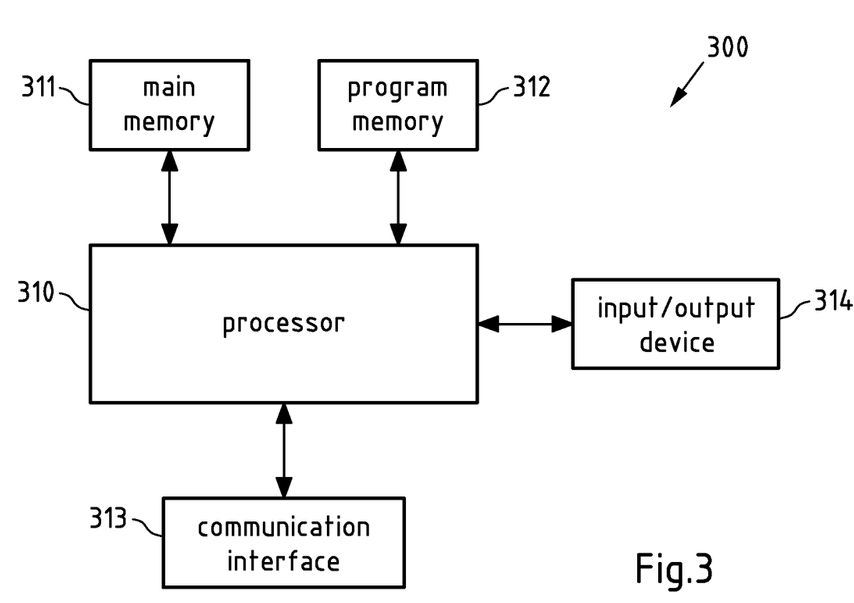
FIG. 3 is a block diagram of an exemplary embodiment of a device according to the second aspect.

FIG. 3 shows a block diagram of an exemplary embodiment of a device 300, which can perform in particular an exemplary method according to the first aspect. The device 300 is for example a device according to the second aspect or a system according to the third aspect.

Device 300 can therefore be a computer, desktop computer, server, thin client or portable computer (mobile device), such as a laptop computer, tablet computer, personal digital assistant (PDA) or smartphone. For example, the device may serve as a server or a client.

Processor 310 of the device 300 is especially designed as a microprocessor, microcontroller, microcontroller, digital signal processor (DSP), application specific integrated circuit (ASIC) or field programmable gate array (FPGA).

Processor 310 performs program instructions stored in program memory 312 and stores, for example, intermediate results or the like in main or working memory 311. For example, program memory 312 is a non-volatile memory such as flash memory, magnetic memory, EEPROM (electrically erasable programmable read-only memory) and/or optical memory. Main memory 311 is for example a volatile or non-volatile memory, in particular a random access memory (RAM) such as a static RAM memory (SRAM), a dynamic RAM memory (DRAM), a ferroelectric RAM memory (FeRAM) and/or a magnetic RAM memory (MRAM).

Program memory 312 is preferably a local data carrier permanently connected to the device 300. Examples of storages that are fixed to the device 300 are hard disks that are built into the device 300. Alternatively, the data carrier may also be, for example, a data carrier separably connectable to the device 300, such as a memory stick, a removable data carrier, a portable hard disk, a CD, a DVD and/or a floppy disk.

For example, program memory 312 contains the operating system of device 300, which is at least partially loaded into main memory 311 when device 300 is started and performed by processor 310. In particular, when device 300 is started, at least part of the core of the operating system is loaded into main memory 311 and performed by processor 310. For example, the operating system of device 300 is a Windows, UNIX, Linux, Android, Apple iOS, and/or MAC operating system.

In particular, the operating system allows the use of the device 300 for data processing. For example, it manages resources such as main memory 311 and program memory 312, communication interface 313, input and output device 314, makes basic functions available to other programs through programming interfaces, among other things, and controls the performing of programs.

Processor 310 controls the communication interface 313, which can be a network interface, for example, and can be designed as a network card, network module and/or modem. The communication interface 313 is set up in particular to establish a connection between the device 300 and other devices, in particular via a (wireless) communication system, for example a network, and to communicate with these devices. The communication interface 313 can, for example, receive data (via the communication system) and forward it to processor 310 and/or receive data from processor 310 and send it (via the communication system). Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network and/or the Internet.

Furthermore, processor 310 can control at least one input/output device 314. For example, an input/output device 314 is a keyboard, a mouse, a display unit, a microphone, a touch-sensitive display unit, a speaker, a reader, a drive and/or a camera. For example, input/output device 314 can receive input from a user and forward it to processor 310 and/or receive and output information for the user from processor 310.

Figure 4:
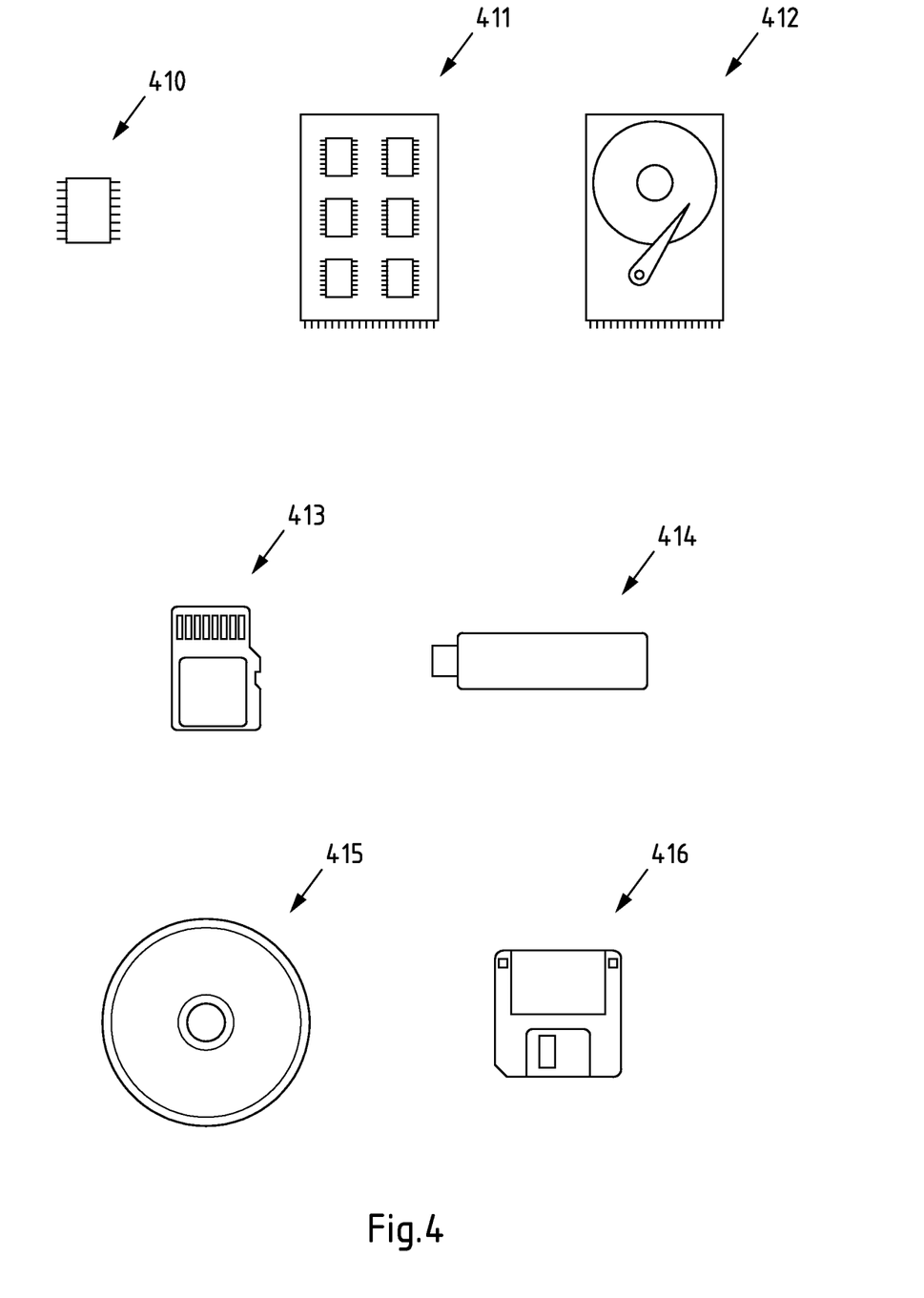
FIG. 4 depicts different exemplary embodiments of a storage medium according to the second aspect.

Finally, FIG. 4 shows different exemplary embodiments of storage media on which an exemplary embodiment of a computer program according to the invention can be stored. The storage medium can be a magnetic, electrical, optical and/or other storage medium. The storage medium may, for example, be part of a processor (e.g., the processor 310 of FIG. 3), for example, a (non-volatile or volatile) program memory of the processor or a part thereof (such as program memory 312 in FIG. 3). Exemplary examples of a storage medium are a flash memory 410, an SSD hard disk 411, a magnetic hard disk 412, a memory card 413, a memory stick 414 (e.g. a USB stick), a CD-ROM or DVD 415 or a floppy disk 416.

The exemplary embodiments of the present invention described in this specification and the optional features and characteristics mentioned in each case in this respect should also be understood as disclosed in all combinations with each other. In particular, unless explicitly stated otherwise, the description of a feature included in an example of an embodiment shall not be understood in the present case to mean that the feature is indispensable or essential for the function of the exemplary embodiment. The sequence of the method steps described in this specification in the individual flowcharts is not mandatory; alternative sequences of method steps are conceivable. The method steps can be implemented in various ways, for example, implementation in software (through program instructions), hardware or a combination of both to implement the method steps is conceivable.

Terms used in the claims such as "comprise", "have", "include", "contain" and the like do not exclude further elements or steps. The expression "at least partially" covers both the "partially" case and the "completely" case. The wording "and/or" should be understood to mean that both the alternative and the combination should be disclosed, i.e. "A and/or B" means "(A) or (B) or (A and B)". The use of the indefinite article does not exclude a plural. A single device may perform the functions of several units or devices mentioned in the claims. Reference marks indicated in the claims are not to be regarded as limitations of the means and steps used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method performed by one or more devices comprising:
   gathering of network topology information indicative of a function of a power network at a predetermined nominal frequency, the nominal frequency being influenced at least partially by an active and/or reactive power input and/or an active and/or reactive power output and/or a rotational speed and/or a torque and/or a modulation angle and/or a phase angle of one or more components which are included in the power network;
   determining harmonic information indicative of one or more harmonic levels from the one or more components of the power network or from one or more network nodes, wherein the harmonic information is determined at least partially based on the network topology information;
   determining an evaluation information indicative of an occurrence of one or more resonances and/or harmonic level increases in the power network, wherein the evaluation information is determined at least partially based on the determined harmonic information;
   outputting of the determined evaluation information; and
   wherein the method further comprises:
   determining control information indicative of a change of a switching state of the power network and/or an operating mode of the power network, the control information being determined in such a way that the one or more resonances and/or harmonic level increases of the power network determined on the basis of the evaluation information are avoided or resolved; and outputting the determined control information therefore changing the switching state of the power network and/or the operating mode of the power network, wherein the control information is determined in such a way that, based on a switching sequence comprised by the control information, intermediate states are taken into account in order to bypass one or more resonances and/or harmonic level increases of the power network during switching.

2. The method according to claim 1, wherein a change of the switching state of the power network is caused at least partially based on the control information.

3. The method according to claim 1, the method further comprising:

performing one or more switching steps to establish the switching state of the power network determined and changed according to the control information.

4. The method according to claim 1, wherein the determination of harmonic information is based at least partially on one or more harmonic calculations and/or on one or more harmonic measurements.

5. The method according to claim 1, whereby the method is performed preventively before a planned change of the switching state of the power network.

6. The method according to claim 5, wherein the gathering of network topology information comprises those components of the power network which are arranged in electrical proximity to the planned change.

7. The method according to claim 1, where the method is performed based on a current switching state of the power network.

8. The method according to claim 1, wherein the control information comprises one or more control parameters, wherein a control parameter is indicative of a switching action for a component of the one or more components comprised by the power network.

9. The method according to claim 8, wherein a switching action or a change for a component of the power network represents at least one of the following switching actions or changes i) to xiii):

i) closing or opening of one or more rings;
ii) coupling or disconnecting of one or more busbars;
iii) supplying loads via one or more reserve network access points;
iv) changing of one or more transformer ratios;
v) switching off or switching on one or more filters;
vi) switching off or switching on one or more compensations;
vii) changing a torque of one or more components of the power network;
viii) changing an operating point consisting of rotational speed and/or torque and/or active power and/or reactive power of one or more components of the power network;
ix) changing the rotational speed of one or more components of the power network;
x) switching off or switching on of already connected components;
xi) changing an active power input or output of one or more components of the power network;
xii) changing a reactive power input or output of one or more components of the power network; and
xiii) changing a modulation angle and/or phase angle of an inverter.

10. The method according to claim 1, wherein the determination of the harmonic information comprises determining voltages, currents and/or frequencies at one or more nodes of the power network.

11. The method according to claim 1, wherein the determination of the harmonic information comprises at least the inductive and/or capacitive components comprised in the power network.

12. The method according to claim 1, wherein possible switching states and/or operating points of the power network of the components of the power network are stored in a database, wherein a resonance information is linked to each stored switching state and/or operating point, wherein the resonance information is at least indicative of whether or not one or more resonances and/or harmonic level increases are present in the switching state and/or operating point.

13. The method according to claim 12, wherein a respective resonance information is determined for each switching state and/or operating point of the one or more components of the power network, wherein all possible switching states and/or operating points of the one or more components of the power network are taken into account and a corresponding resonance information is calculated for each of all possible switching states and/or operating points.

14. The method according to claim 13, wherein the resonance information is represented in frequency characteristics of amplitudes of current and/or voltage, so that it can be determined whether or not there is a risk of a resonance catastrophe and/or harmonic level increase for a component or a network node or several components or a network area of the power network.

15. A device adapted or comprising corresponding means comprising at least one processor and at least one memory containing computer program code, wherein the at least one memory and the computer program code are adapted to perform and/or control with the at least one processor at least:

gathering of network topology information indicative of a function of a power network at a predetermined nominal frequency, the nominal frequency being influenced at least partially by an active and/or reactive power input and/or an active and/or reactive power output and/or a rotational speed and/or a torque and/or a modulation angle and/or a phase angle of one or more components which are included in the power network;

determining harmonic information indicative of one or more harmonic levels from the one or more components of the power network or from one or more network nodes, wherein the harmonic information is determined at least partially based on the network topology information;

determining an evaluation information indicative of an occurrence of one or more resonances and/or harmonic level increases in the power network, wherein the evaluation information is determined at least partially based on the determined harmonic information;

outputting of the determined evaluation information; and the at least one memory and the computer program code configured to, with the at least one processor, cause the device further to perform:

determining control information indicative of a change of a switching state of the power network and/or an operating mode of the power network, the control information being determined in such a way that the one or more resonances and/or harmonic level increases of the power network determined on the basis of the evaluation information are avoided or resolved; and outputting the determined control information therefore changing the switching state of the power network and/or the operating mode of the power network, wherein the control information is determined in such a way that, based on a switching sequence comprised by the control information, intermediate states are taken into account in order to bypass one or more resonances and/or harmonic level increases of the power network during switching.

16. A computer-readable storage medium comprising program instructions that when executed by a processor cause an apparatus to perform and/or control:

gathering of network topology information indicative of a function of a power network at a predetermined nominal frequency, the nominal frequency being influenced at least partially by an active and/or reactive power input and/or an active and/or reactive power output and/or a rotational speed and/or a torque and/or a modulation angle and/or a phase angle of one or more components which are included in the power network;

determining harmonic information indicative of one or more harmonic levels from the one or more components of the power network or from one or more network nodes, wherein the harmonic information is determined at least partially based on the network topology information;

determining an evaluation information indicative of an occurrence of one or more resonances and/or harmonic level increases in the power network, wherein the evaluation information is determined at least partially based on the determined harmonic information;

outputting of the determined evaluation information; and wherein the computer-readable storage medium further comprises program instructions that when executed cause by the processor causing the apparatus to perform and/or control:

determining control information indicative of a change of a switching state of the power network and/or an operating mode of the power network, the control information being determined in such a way that the one or more resonances and/or harmonic level increases of the power network determined on the basis of the evaluation information are avoided or resolved; and outputting the determined control information therefore changing the switching state of the power network and/or the operating mode of the power network, wherein the control information is determined in such a way that, based on a switching sequence comprised by the control information, intermediate states are taken into account in order to bypass one or more resonances and/or harmonic level increases of the power network during switching.

17. Use of the method according to claim 1 for an onshore wind farm and/or an offshore wind farm and/or a power station, wherein the power station comprises one or more photovoltaic modules, in particular several interconnected photovoltaic modules, and/or for a photovoltaic power station comprising one or more photovoltaic modules, cables and/or transformers.

* * * * *